May 6, 1958 R. W. KLING 2,833,556
WEIGHT TRANSFER SYSTEM AND APPARATUS
FOR TRACTOR-TRAILERS
Filed Jan. 30, 1957 3 Sheets-Sheet 1

Inventor
Robert W. Kling
By Horton, Davis, Brewer
and Brugman
Attorneys

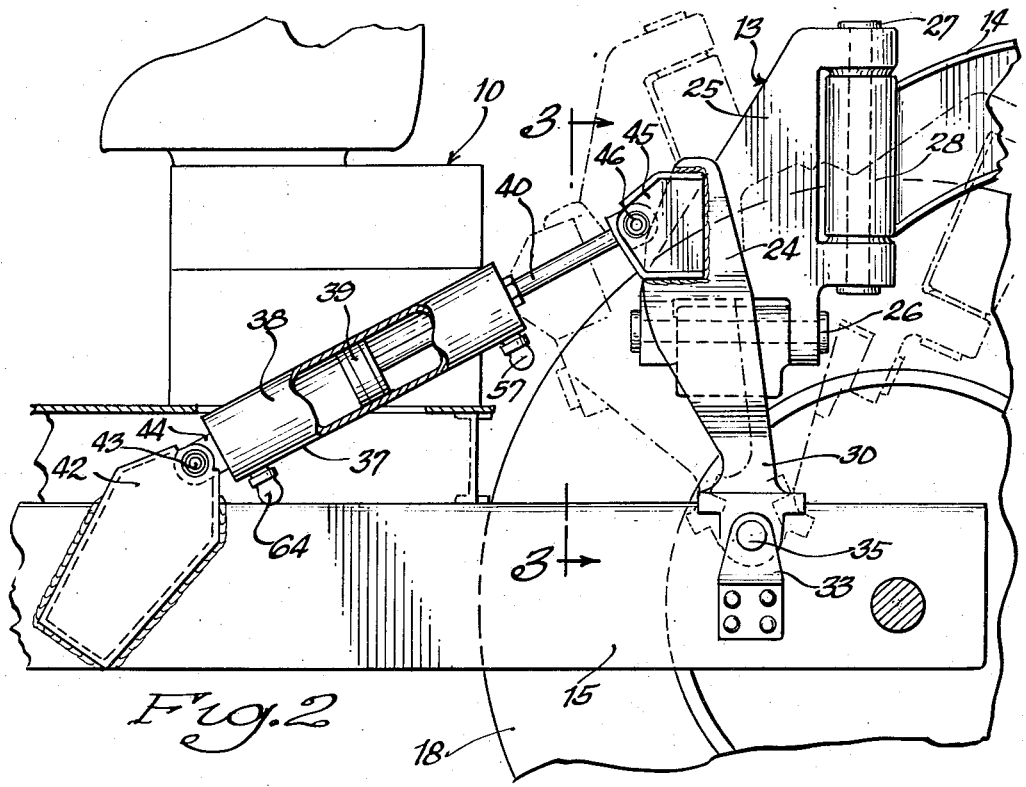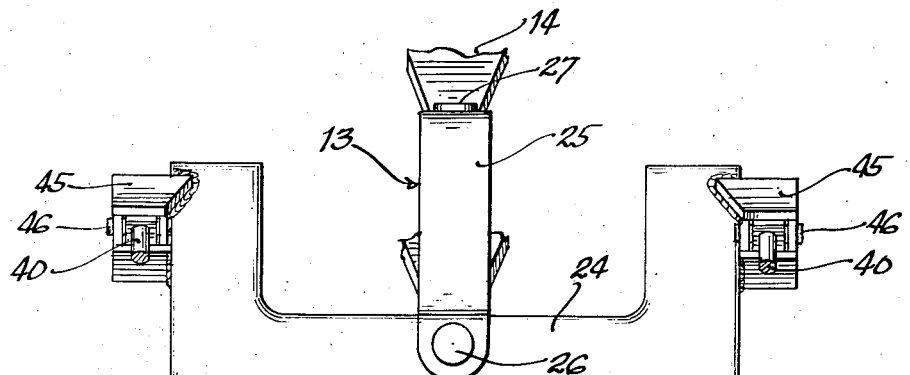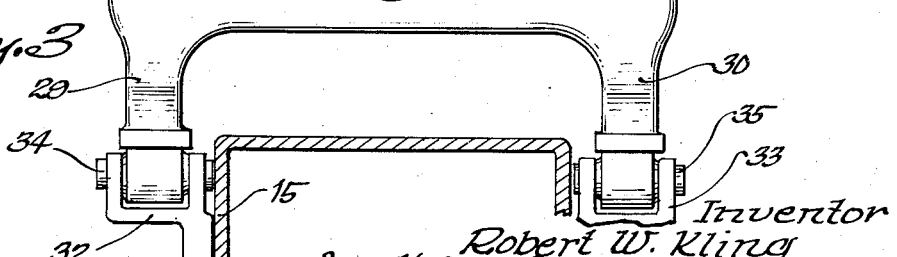

May 6, 1958

R. W. KLING 2,833,556

WEIGHT TRANSFER SYSTEM AND APPARATUS FOR TRACTOR-TRAILERS

Filed Jan. 30, 1957

Inventor:
Robert W. Kling
by Horton, Davis, Brewer
and Brugman
Attorneys

United States Patent Office 2,833,556
Patented May 6, 1958

2,833,556

WEIGHT TRANSFER SYSTEM AND APPARATUS FOR TRACTOR-TRAILERS

Robert W. Kling, Wilmette, Ill., assignor to Athey Products Corporation, Chicago, Ill., a corporation of Illinois Application January 30, 1957, Serial No. 637,204

3 Claims. (Cl. 280—405)

This application relates to a weight transfer system and apparatus, and more particularly to such a system and apparatus which are adapted to use on load hauling vehicles of the tractor-trailer type.

In load hauling equipment, and particularly that of the tractor-trailer type, it is often desirable, and sometimes necessary, to effect a transfer of the weight normally carried by different sets of wheels of the combined vehicle, thereby to improve the operation and handling of the vehicle, as by affording an effective proportioning of the load weight distribution between the front and rear wheels of a four wheel tractor.

Since such vehicles operate over rough and irregular terrain, some flexibility must be incorporated into the weight transfer mechanism to allow the wheels to follow the terrain without materially interfering with the operation of the mechanism or defeating its purpose.

One of the objects of this invention is to provide a weight transfer system and apparatus of the class referred to and incorporating a compressible fluid type cushioning means for imparting flexibility for relative movements of parts in a system utilizing a relatively non-compressible liquid as a primary actuating means.

Another and more specific object of my invention is to provide a weight transfer system and apparatus for use on tractor-trailer type load hauling vehicles and having hydraulically operated rams for effecting a controllable weight transfer, the hydraulic system for said rams embodying an accumulator, wherein a piston is mounted for floating movements in a cylinder between a charge of a compressible fluid under selected pressure and the hydraulic fluid which operates the rams, thereby to serve as a cushion providing flexibility to the operations of the rams.

As a corollary to the preceding object, my invention comprehends the provision of an accumulator piston having an area considerably greater than the ram piston areas, so that cushioned movements of the rams cause relatively lesser movements of the accumulator piston and cause only small changes in the pressure of the charge of compressible fluid in the accumulator.

My invention further has within its purview the provision of a weight transfer system and apparatus of the type to which reference has been made and wherein the hydraulic rams are operated at relatively high fluid pressures, so that relatively small diameter rams provide the required force, and the accumulator has a capacity sufficient to permit full movement of the rams.

Other objects and advantages of the invention will be apparent from the following description and the accompanying drawings in which similar characters of reference indicate similar parts throughout the several views.

Referring to the drawings of which there are three sheets:

Fig. 2 is a fragmentary side elevational view of a portion of the structure illustrated in Fig. 1, with parts cut away to illustrate details of the structure of the weight transfer system and apparatus in its adaptation to the tractor-trailer load hauling vehicle;

Fig. 3 is a fragmentary front sectional view taken substantially as indicated by a line 3—3 and accompanying arrows in Fig. 2;

Figure 1:
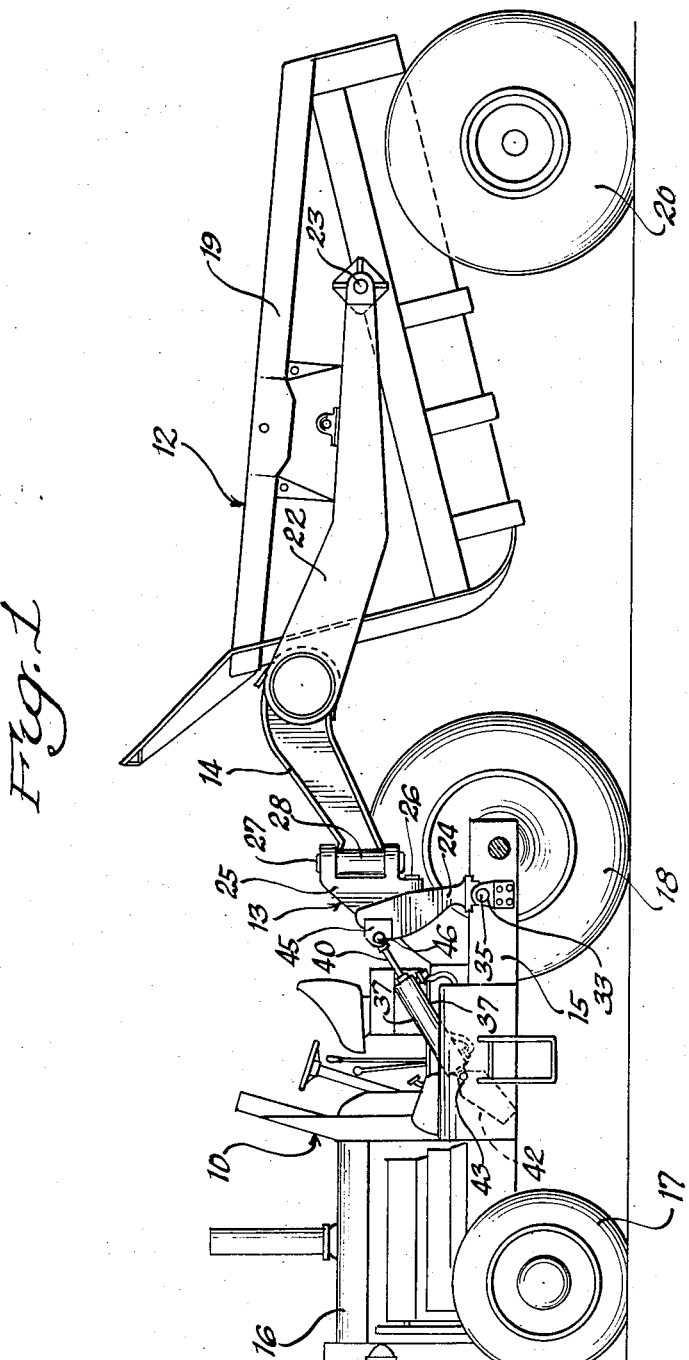
Fig. 1 is a side elevational view of a tractor-trailer type of load hauling vehicle which embodies a preferred adaptation of my weight transfer system and apparatus.
Figure 4:
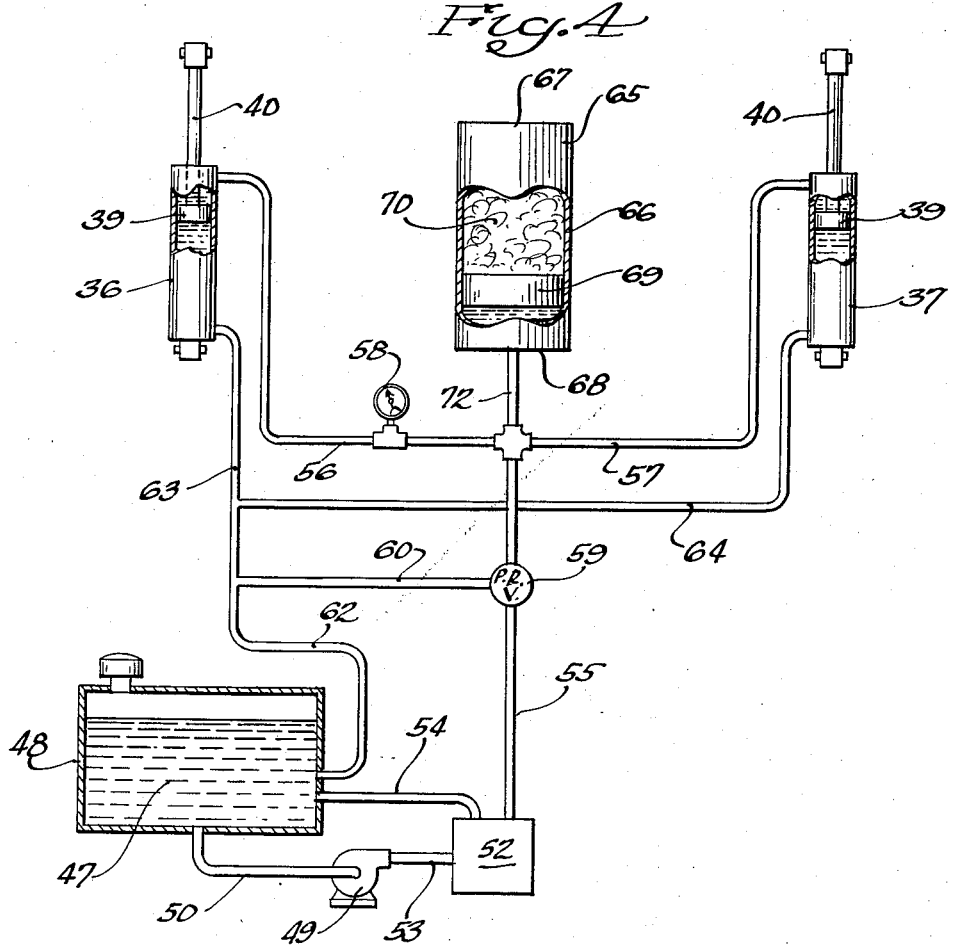
Figure 4A:
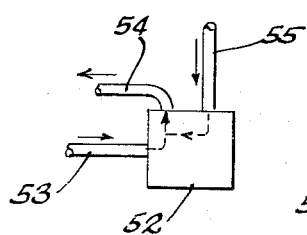
Figure 4B:
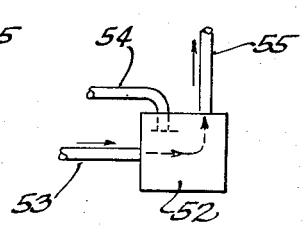
Figure 4C:
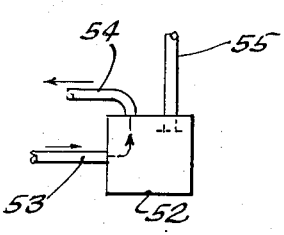

Fig. 4 is a diagrammatic view showing the connections and operating parts of my weight transfer system and apparatus; and Figs. 4a, 4b, and 4c are diagrammatic views of a portion of the apparatus diagrammatically depicted in Fig. 4, and respectively illustrate operating positions or conditions wherein the apparatus is adapted for (a) normal hauling without use of the weight transfer apparatus, (b) the operation of transferring weight to the driving wheels of the tractor, and (c) normal operation of the vehicle with weight transferred to the rear driving wheels of the tractor.

In the exemplary embodiment of my invention which is shown in the accompanying drawings for illustrative purposes, my weight transfer system and apparatus are illustrated in an adaptation to a tractor-trailer load hauling vehicle which includes a tractor 10 and a trailer 12 connected for motivation of the load hauling trailer 12 by the tractor 10 through a hitch 13, wherein a draw bar 14 at the front of the trailer 12 is connected to the rear end of frame 15 of the tractor 10 for swinging movements relative to three laterally disposed axes. The tractor 10 has a prime mover, such as an internal combustion engine, enclosed within a housing 16, and in the form disclosed, has front steerable wheels 17 and rear driving wheels 18.

The trailer 12, in the form illustrated, has a load hauling body 19 supported near the rear end by wheels 20. The disclosed trailer being adapted to rear dumping, side arms 22 on the draw bar 14 extend rearwardly along opposite sides of the body 19 and are connected to the body side walls at their rear ends, so that the body is swingable vertically relative to the side arms about an axis 23. The trailer wheels being near the rear end of the body 19, the forward end of the body is supported by the side arms 22, whereby a portion of the weight of the trailer and its load is transferred to, and supported by, the rear end of the tractor 10 through the draw bar 14 and hitch 13.

In order that the tractor-trailer vehicle may turn corners and travel over hilly and rough terrain, the hitch 13 and its connection to the draw bar 14 embody swivel connections having transversely disposed axes. In the form illustrated, the hitch 13 embodies a yoke 24 and a swivel head 25 connected for swinging or rocking movement laterally of the vehicle and relative to the axis of a pin 26 which extends through the mid portion of the yoke 24 and the lower end portion of the swivel head 25. The swivel head is also coupled and connected to the front end of the draw bar 14 by a kingpin 27 which extends through the rear portion of the swivel head and a bearing 28 at the front end of the draw bar; the axis of the kingpin 27 being lateral to the axis of the pin 26 to provide for relative turning movements of the tractor with respect to the trailer. At the lower portion of the yoke 24, downwardly extending side legs 29 and 30 thereon are movably supported from opposite sides of the tractor frame through brackets 32 and 33, the brackets being secured to the tractor frame 15 and the side legs 29 and 30 of the yoke being connected to the brackets by pins 34 and 35 which are co-axial and have their axis extending laterally of the vehicle and substantially parallel to the axis of the tractor driving wheels 18.

As may be readily understood, changes in direction of movement of the tractor relative to the trailer in a vertical direction, occasioned by changes of slope in the terrain or in the passage of the wheels over bumps or through depressions, cause rocking movement of the yoke 24 relative to the tractor frame. It may also be readily understood that with a given load distribution in the trailer, the support of the load and trailer weight is proportioned between the trailer wheels 20 and the tractor wheels 17 and 18, the load being transmitted to the tractor wheels through the draw bar 14 and hitch 13, with the parts in the positions caused by the terrain and the relative positions of the tractor and trailer.

It being desirable in many instances to cause an effective reapportionment of the weight distribution between the tractor and trailer wheels, as for example to increase the effective weight on the tractor driving wheels, while maintaining sufficient effective weight on the front steerable wheels of the tractor for stability and adequate steering control, I have provided a weight transfer system and apparatus which functions to produce the desired weight transfer without materially interfering with the normal movements of the tractor and trailer through the swivel connections of the hitch 13.

In the disclosed structure, hydraulic rams 36 and 37 are mounted on opposite sides of the tractor frame at laterally aligned positions forwardly of the brackets 32 and 33 by which the yoke 24 is connected to the frame. Each of the rams has a cylinder 38 in which a piston 39 is mounted for linear movement longitudinally of the cylinder. Each piston has a piston rod 40 secured thereto, which piston rod extends beyond the end of the cylinder. Although the rams might be reversed, each one, in the present instance, is mounted with one end of the cylinder 38 hingedly connected to a plate 42 secured to one side of the tractor frame 15, the hinge connection to the plate 42 being made through a crosspin 43 extending through the plate and through a projecting connecting lug 44 on the end of the cylinder. The extending end of each piston rod 40 is connected to the upper portion of the yoke 24 through a bracket 45 secured to the yoke. A movable connection is provided between the piston rod and the bracket 45 by a crosspin 46. Since the cylinder is connected to the tractor frame at a position spaced from the yoke 24 and the piston rod is connected to the yoke 24 at a position spaced from the tractor frame, the tractor frame, yoke and ram, at each side of the tractor, form the three sides of similar triangles.

With this arrangement of parts, swinging movements of the yoke 24 relative to the tractor frame 15 about the axis of the pins 34 and 35 which connect the yoke to the frame, which movements occur during usual and normal operations of the vehicle, cause linear movements of the pistons 39 within their respective cylinders. It may also be readily understood that forces exerted by the rams 36 and 37 at their positions of connection to the yoke 24 and tractor frame 15 will tend to effect a change of the position of the yoke 24 relative to the tractor frame and will thereby produce an effective reapportionment of the normal load between the wheels of the tractor and trailer.

For producing such an effective weight transfer or reapportionment of the effective weight on the wheels of the tractor and trailer, I have provided an hydraulic system as depicted in Figs. 4, 4a, 4b and 4c. In this system, a relatively non-compressible liquid 47, such as oil, is used for actuating the rams 36 and 37 so that relatively high pressures may be utilized for producing the required forces in the rams, while rams of relatively small diameter and bulk are sufficient to serve the purpose.

A supply of the relatively non-compressible liquid 47 is carried in a sump or reservoir 48 on the tractor. A pump 49 connected to the lower portion of the reservoir 48 through a conduit 50 and driven by the tractor prime mover serves as a source of liquid under pressure. The output or pressure side of the pump 49 is connected to a manually operable valve 52 through a conduit 53. A conduit 54, having one end connected to a port of the valve 52 and its other end connected to the reservoir 48, serves as a return line for the flow of liquid from the valve to the reservoir. Another conduit 55 has one end connected to a port of the valve 52 and serves as a feed line for liquid under pressure to the rams 36 and 37, the ram 36 receiving its liquid under pressure from the feed line 55 through a branch line 56, and the ram 37 receiving its supply of liquid under pressure from a branch line 57. As indicated, a pressure gauge 58 may be incorporated in one of the feed lines to the rams, as in the branch line 56, to indicate the pressures developed in the rams during the flow of liquid under pressure thereto. Such a gauge may be calibrated in terms of the weight transferred to the tractor driving wheels by the force exerted in the rams.

As a precautionary measure, a pressure relief valve 59 is connected in series with the supply conduit 55 and is set to afford pressure relief at some predetermined maximum operating pressure in the system. A conduit 60 connects the relief valve to a return line 62 for returning liquid to the reservoir 48 when the maximum operating pressure of the relief valve is exceeded. Also, conduits 63 and 64 are connected to the ends of the cylinders of the rams 36 and 37 opposite the ends at which the pressure lines 56 and 57 are connected to return any liquid to the reservoir which may leak past the pistons 39 in the respective rams.

One operative setting of the valve 52 is illustrated diagrammatically in Fig. 4a. With this setting, liquid under pressure from the pressure side of the pump 49 flows into the valve through the conduit 53 and is connected for return to the reservoir 48 through the conduit 54, thereby merely circulating from the reservoir through the pump and back to the reservoir. With this setting also, the conduit 55 is connected to the reservoir, so that no liquid under pressure is trapped in the ram cylinders and the pistons 39 are free to move in the cylinders of the respective rams 36 and 37.

When the valve 52 is shifted to the setting shown in Fig. 4b, the return conduit 54 which extends from the reservoir to the valve is closed in the valve, so that there can be no return of liquid to the reservoir through that return conduit. The conduit 53 from the pressure side of the pump 49 is connected to the supply conduit 55 through the valve, so that liquid under pressure is supplied to each of the rams through the pressure relief valve 59 and the branch conduits 56 and 57. Liquid under pressure is supplied to the rams 36 and 37 until the desired pressure is reached, as indicated by the gauge 58. With this valve setting, the desired effective transfer of weight to the tractor driving wheels is produced.

When the desired transfer of effective load has been reached, as indicated by the gauge 58, the valve 52 is shifted to the setting illustrated in Fig. 4c. With this setting, the conduit 55 is closed in the valve, so that the established pressure is maintained in the rams 36 and 37. Also, the conduit 53 from the pressure side of the pump 49 is connected to the return conduit 54, so that the pump merely circulates liquid from and to the reservoir 48. This setting of the valve is provided for maintaining the desired operating pressure in the rams for accomplishing the desired weight transfer during normal operation of the vehicle.

In order to provide flexibility in the system, which will permit relative movement of the pistons and cylinders of the rams 36 and 37 during movements of the vehicle over irregular terrain, while maintaining the desired weight transfer within reasonable limits, it is necessary to add another element to the system. For this purpose, I have provided an accumulator 65 which comprises a cylinder 66 having a normally closed end 67 and a ported end 68. A piston 69 is fitted into the cylinder 66 for sliding movement longitudinally of the cylinder. Between the piston 69 and the closed end 67 of the cylinder 66, a charge of a compressible fluid 70 is introduced under a pressure comparable to and normally somewhat less than the maximum predetermined operating pressure of the liquid in the rams 36 and 37. This fluid is desirably an inert and noncombustible gas, such as nitrogen. With this charge maintained in the cylinder 66, the normal position of the piston 69 is against the ported end 68 of the cylinder. Through a conduit 72 connected to the branch lines 56 and 57 through which liquid under pressure is supplied to the rams 36 and 37, the ported end 68 of the cylinder is connected to receive liquid under pressure as that liquid is supplied to the rams 36 and 37. Since the piston 69 is free to float in the cylinder 66, it moves to a position in which the force of the liquid under pressure in the ported end of the cylinder is equalized by the pressure exerted by the compressible fluid which is trapped between the piston 69 and the closed end of the cylinder.

During operation of the vehicle while force is being applied by the rams for producing an effective weight transfer on the wheels, movements of the ram pistons, which are caused by irregularities of terrain, produce pressure variations in the closed system which includes the ram cylinders and the liquid in the accumulator 65, and thereby cause movements of the piston 69 which balance the force changes against the variable pressure of the compressible fluid in the accumulator.

As previously mentioned, the rams 36 and 37 are operated at relatively high liquid pressures such, for example, as in the region of 1200 pounds per square inch, in order to limit the required ram diameters for providing the requisite forces. On the other hand, and since the accumulator can be placed at an out-of-the-way position on the tractor, the area of the piston 69 in the accumulator is desirably materially larger than the areas of the ram pistons so that even relatively large movements of the ram pistons in their respective cylinders produce considerably less movement of the accumulator piston 69 in the accumulator cylinder 66 by virtue of the movement of liquid between the rams and the accumulator. With such proportions between the ram and accumulator piston diameters, the required volume of liquid can be moved between the rams and the accumulator with only a limited variation in the operating pressure in the system which is proportional to the change of volume of the compressible gas in the accumulator, and which volumetric change in the gas is produced by the flow of liquid to or from the accumulator. In the disclosed system, the volume and normal pressure of the compressible fluid in the accumulator, as well as the volume of the accumulator, are preselected to provide for full movement of the ram pistons from end to end of their respective cylinders with only limited movement of the accumulator piston.

From the foregoing description and reference to the accompanying drawings, it may be readily understood that I have provided an hydraulically actuated weight transfer system and apparatus adaptable to load hauling vehicles such as those of the tractor-trailer type, which is not only readily applied to such vehicles, but which is well adapted to the accomplishment of the desired transfer of effective weight between the vehicle wheels while affording the flexibility required for operation of the vehicle under commonly encountered conditions of operation and without materially changing the preselected weight transfer as a result of changes of the relative positions of the operating parts of the vehicle.

It is understood that the foregoing description is merely illustrative of a preferred embodiment of the invention and that the scope of the invention is not to be limited thereto but is to be determined by the appended claims.

I claim:

1. In a load hauling vehicle of the tractor-trailer type, wherein the tractor has a wheel supported frame, and the trailer has a draw bar connected to the tractor frame through a yoke, said yoke being swingably connected to the tractor frame for movements about an axis substantially parallel to the axis of the tractor wheels, the combination therewith of a weight transfer system and apparatus comprising hydraulic rams having relatively movable piston and cylinder means, one of which on each ram is connected to the tractor frame at a position spaced from the yoke, and the other of which is connected to the yoke at a position spaced from the tractor frame, the connections of the piston and cylinder means of the rams to the tractor frame and yoke being movable relative to axes substantially parallel to the axis of swinging movement of the yoke, and hydraulic means including a source of liquid under pressure for supplying said liquid to the rams, said hydraulic means also including an accumulator comprising a cylinder, one end of which has a connection thereto for the flow of liquid under pressure to and from said rams, and the other end of which is normally closed, a piston mounted for floating movement in said cylinder, and a compressible fluid under predetermined pressure trapped in said cylinder between the normally closed end thereof and said piston, whereby the position of said piston is determined by the balance of the pressure of the liquid under pressure in said rams and the pressure of the trapped compressible fluid.

2. In a combination as defined in claim 1, the area of the piston in said accumulator being materially larger than the areas of the piston means of said rams to limit accumulator piston movement effected by movements of the rams, thereby to tend to limit the fluid and liquid pressure variations which accompany movements of the ram piston means.

3. In a combination as defined in claim 2, the volume of said trapped compressible fluid in the accumulator at pressures within the operating pressure range of the system being greater than the liquid capacities of the rams.

References Cited in the file of this patent

UNITED STATES PATENTS

| | | |
|---|---|---|
| 2,249,402 | Stefano | July 15, 1941 |
| 2,360,903 | Simmons | Oct. 24, 1944 |
| 2,636,777 | Peller | Apr. 28, 1953 |
| 2,720,417 | Kling | Oct. 11, 1955 |

FOREIGN PATENTS

| | | |
|---|---|---|
| 518,848 | Great Britain | Mar. 8, 1940 |